United States Patent
Hasan et al.

(10) Patent No.: US 11,410,525 B2
(45) Date of Patent: Aug. 9, 2022

(54) SYSTEMS AND METHODS FOR GENERATING HAZARD ALERTS FOR A SITE USING WEARABLE SENSORS

(71) Applicant: General Electric Company, Schenectady, NY (US)

(72) Inventors: Sm Shajedul Hasan, Rexford, NY (US); G. Bowden Wise, Clifton Park, NY (US); Lembit Salasoo, Schenectady, NY (US); Robert Paul Fisher, Guilderland, NY (US); Keith Francis Zeto, Albany, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/952,419

(22) Filed: Nov. 19, 2020

(65) Prior Publication Data

US 2022/0157147 A1    May 19, 2022

(51) Int. Cl.
*G06Q 10/08*    (2012.01)
*G08B 21/04*    (2006.01)
(Continued)

(52) U.S. Cl.
CPC ......... *G08B 21/0469* (2013.01); *G06F 1/163* (2013.01); *G08B 21/182* (2013.01);
(Continued)

(58) Field of Classification Search
CPC .. G08B 21/0469; G08B 21/182; G08B 31/00; G08B 26/008; G08B 21/0275; G06F 1/163; H04W 4/029; A41D 13/002; A62B 18/08
See application file for complete search history.

(56) References Cited

U.S. PATENT DOCUMENTS 8,085,144 B2    12/2011   Appelt et al.
9,792,798 B2    10/2017   Jobin et al.
(Continued)

FOREIGN PATENT DOCUMENTS

WO    2019046580 A1    3/2019
WO    2019084312 A1    5/2019
WO    WO-2019244125 A2 * 12/2019    ............. A62B 99/00

OTHER PUBLICATIONS

Corbellini et al., "A System for Monitoring Workers' Safety in an Unhealthy Environment by means of Wearable Sensors", 2008 IEEE Instrumentation and Measurement Technology Conference, Victoria, BC, pp. 951-955, May 12-15, 2008.
(Continued)

*Primary Examiner* — An T Nguyen
(74) *Attorney, Agent, or Firm* — Armstrong Teasdale LLP (57) ABSTRACT

A system for generating hazard alerts is provided. The system includes a plurality of sensor units including a plurality of sensors and a locating device, and a hazard analyzing (HA) computing device configured to communicate with the sensor units and including at least one memory device configured to store a scene definition, the scene definition defining a coordinate space of a worksite, and at least one processor configured to receive, from the sensors, a plurality of sensor measurements, receive, from the locating device of each sensor unit, at least one coordinate of the coordinate space, determine, based on the at least one coordinate, a location of the sensor unit during each sensor measurement, and determine, for at least a first sensor unit, that an alert condition is present based on the scene definition, the sensor measurements, and the determined location associated with the first sensor unit.

20 Claims, 6 Drawing Sheets

(51) Int. Cl.
*G06F 1/16* (2006.01)
*G08B 21/18* (2006.01)
*G08B 31/00* (2006.01)
*G08B 26/00* (2006.01)
*H04W 4/029* (2018.01)

(52) U.S. Cl.
CPC ........... *G08B 26/008* (2013.01); *G08B 31/00* (2013.01); *H04W 4/029* (2018.02)

(56) References Cited

U.S. PATENT DOCUMENTS

| | | | |
|---|---|---|---|
| 10,032,352 | B2 | 7/2018 | Kozloski et al. |
| 10,204,501 | B2 | 2/2019 | Chong et al. |
| 10,261,061 | B2 | 4/2019 | Mr |
| 10,282,957 | B1* | 5/2019 | Kirkbride ............. G01J 5/0066 |
| 10,307,101 | B1 | 6/2019 | Miller et al. |
| 10,425,705 | B1 | 9/2019 | Manzella et al. |
| 10,607,467 | B2* | 3/2020 | Kanukurthy ....... G06Q 10/0635 |
| 10,885,759 | B1 | 1/2021 | Lee et al. |
| 11,181,893 | B2* | 11/2021 | Celia ....................... G06N 7/005 |
| 2007/0171042 | A1* | 7/2007 | Metes .............. G08B 13/19621 340/539.22 |
| 2014/0240088 | A1* | 8/2014 | Robinette .......... G06K 19/0711 340/5.61 |
| 2017/0011326 | A1 | 1/2017 | Liao et al. |
| 2017/0169533 | A1* | 6/2017 | O'Brien ............... G06Q 10/105 |
| 2017/0193623 | A1 | 7/2017 | Gamavi et al. |
| 2017/0206534 | A1* | 7/2017 | O'Brien ................. A41D 1/002 |
| 2017/0245806 | A1* | 8/2017 | Elhawary ............. A61B 5/1122 |
| 2017/0289760 | A1* | 10/2017 | Sainfort ................ H04W 4/023 |
| 2017/0302741 | A1 | 10/2017 | Conner |
| 2017/0339741 | A1* | 11/2017 | K ............................. H04W 4/02 |
| 2018/0108236 | A1* | 4/2018 | Kanukurthy ........... A62B 9/006 |
| 2018/0160943 | A1* | 6/2018 | Fyfe ...................... A61B 5/1112 |
| 2018/0211345 | A1* | 7/2018 | Bean ...................... H04W 84/18 |
| 2018/0289095 | A1* | 10/2018 | Catterson ............. A42B 3/0453 |
| 2019/0073618 | A1 | 3/2019 | Kanukurthy et al. |
| 2019/0122036 | A1 | 4/2019 | Ward et al. |
| 2019/0149715 | A1 | 5/2019 | Kraeling et al. |
| 2019/0343429 | A1 | 11/2019 | Elhawary et al. |
| 2019/0347597 | A1* | 11/2019 | Asendorf ............... H04B 1/385 |
| 2020/0007741 | A1 | 1/2020 | Johnson et al. |
| 2020/0193341 | A1* | 6/2020 | Barak ...................... F16P 3/142 |
| 2020/0206928 | A1* | 7/2020 | Denenberg ........... G01S 7/4808 |
| 2021/0015415 | A1 | 1/2021 | Ofir et al. |
| 2021/0210202 | A1* | 7/2021 | Awiszus ............... G06K 9/6256 |
| 2021/0350312 | A1* | 11/2021 | Swift ............... G06Q 10/06313 |

OTHER PUBLICATIONS

Wu et al., "Design and Implementation of a Wearable Sensor Network System for IoT-Connected Safety and Health Applications", 2019 IEEE 5th World Forum on Internet of Things (WF-IoT), Limerick, pp. 87-90, Apr. 15-18, 2019.

Podgorski et al., "Towards a conceptual framework of OSH risk management in smart working environments based on smart PPE, ambient intelligence and the Internet of Things technologies," dated 2017, International Journal of Occupational Safety and Ergonomics vol. 23, issue No. 1, pp. 1-20.

* cited by examiner

SYSTEMS AND METHODS FOR GENERATING HAZARD ALERTS FOR A SITE USING WEARABLE SENSORS

BACKGROUND

The field of the invention relates generally to worksite monitoring systems, and more particularly, to systems and methods for generating hazard alerts using quantitative scoring.

Worksites and other locations may include various hazards that may not be visible or readily apparent to individuals at the site, but may be detected through the use of sensors. However, a single sensor measurement is generally insufficient to determine whether hazardous conditions are present, and if they are, to what degree the conditions pose a risk of danger or injury to individual workers. Current systems generally do not aggregate multiple sensor measurements or measurements of different types, which limits the ability of current systems to use sensors to determine when hazards are present, to determine the nature of such hazards, and to generate corresponding alerts when hazards are detected.

An improved system for generating alerts based on worksite sensor measurements is therefore desirable.

BRIEF DESCRIPTION

In one aspect, a system for generating hazard alerts is provided. The system includes a plurality of sensor units. Each sensor unit of the plurality of sensor units includes a plurality of sensors and a locating device. The system further includes a hazard analyzing (HA) computing device configured to communicate with the plurality of sensor units. The HA computing device includes at least one memory device configured to store a scene definition. The scene definition defines a coordinate space of a worksite. The HA computing device further includes at least one processor. The at least one processor is configured to receive, from the plurality of sensors, a plurality of sensor measurements. The at least one processor is further configured to receive, from the locating device of each sensor unit, at least one coordinate of the coordinate space. The at least one processor is further configured to determine, based on the at least one coordinate, a location of the sensor unit during each sensor measurement of the plurality of sensor measurements. The at least one processor is further configured to determine, for at least a first sensor unit of the plurality of sensor units, that an alert condition is present based on the scene definition, the plurality of sensor measurements, and the determined location associated with the first sensor unit.

In another aspect, a method for generating hazard alerts is provided. The method is performed by a hazard analysis (HA) computing device including at least one processor coupled to at least one memory device and further coupled to at least one sensor unit including a plurality of sensors and a locating device. The at least one memory device is configured to store a scene definition defining a coordinate space of a worksite. The method includes receiving, by the at least one processor, from the plurality of sensors, a plurality of sensor measurements. The method further includes receiving, by the at least one processor from the locating device of each sensor unit, at least one coordinate of the coordinate space. The method further includes determining, by the at least one processor, based on the at least one coordinate, a location of the sensor unit during each sensor measurement of the plurality of sensor measurements. The method further includes determining, by the at least one processor, for at least a first sensor unit of the plurality of sensor units, that an alert condition is present based on the scene definition, the plurality of sensor measurements, and the determined location associated with the first sensor unit.

In another aspect, a hazard analysis (HA) computing device is provided. The HA computing device includes at least one processor coupled to at least one memory device and further coupled to at least one sensor unit including a plurality of sensors and a locating device. The at least one memory device is configured to store a scene definition defining a coordinate space of a worksite. The at least one processor is configured to receive, from the plurality of sensors, a plurality of sensor measurements. The at least one processor is further configured to receive, from the locating device of each sensor unit, at least one coordinate of the coordinate space. The at least one processor is further configured to determine, based on the at least one coordinate, a location of the sensor unit during each sensor measurement of the plurality of sensor measurements. The at least one processor is further configured to determine, for at least a first sensor unit of the plurality of sensor units, that an alert condition is present based on the scene definition, the plurality of sensor measurements, and the determined location associated with the first sensor unit.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The embodiments described herein include a system for generating hazard alerts. The system includes a plurality of sensor units. Each sensor unit of the plurality of sensor units includes a plurality of sensors and a locating device. The system further includes a hazard analyzing (HA) computing device configured to communicate with the plurality of sensor units. The HA computing device includes at least one memory device configured to store a scene definition. The scene definition defines a coordinate space of a worksite. The HA computing device further includes at least one processor. The at least one processor is configured to receive, from the plurality of sensors, a plurality of sensor measurements. The at least one processor is further configured to receive, from the locating device of each sensor unit, at least one coordinate of the coordinate space. The at least one processor is further configured to determine, based on the at least one coordinate, a location of the sensor unit during each sensor measurement of the plurality of sensor measurements. The at least one processor is further configured to determine, for at least a first sensor unit of the plurality of sensor units, that an alert condition is present based on the scene definition, the plurality of sensor measurements, and the determined location associated with the first sensor unit.

While the system is described herein as being implemented in a worksite, in some embodiments, the system is implemented in other environments such as, for example, institutional environments (e.g., eldercare facilities, hospital, schools, or dormitories), recreational environments (e.g., gyms, walking and hiking trails, or swimming pools), sporting environments (e.g., training environments or game environments), commercial environments (e.g., offices, shopping centers and stores, airplanes, cruise ships, or ferries), in-home environments, military environments, livestock and pet environments, or other environments.

Figure 1:
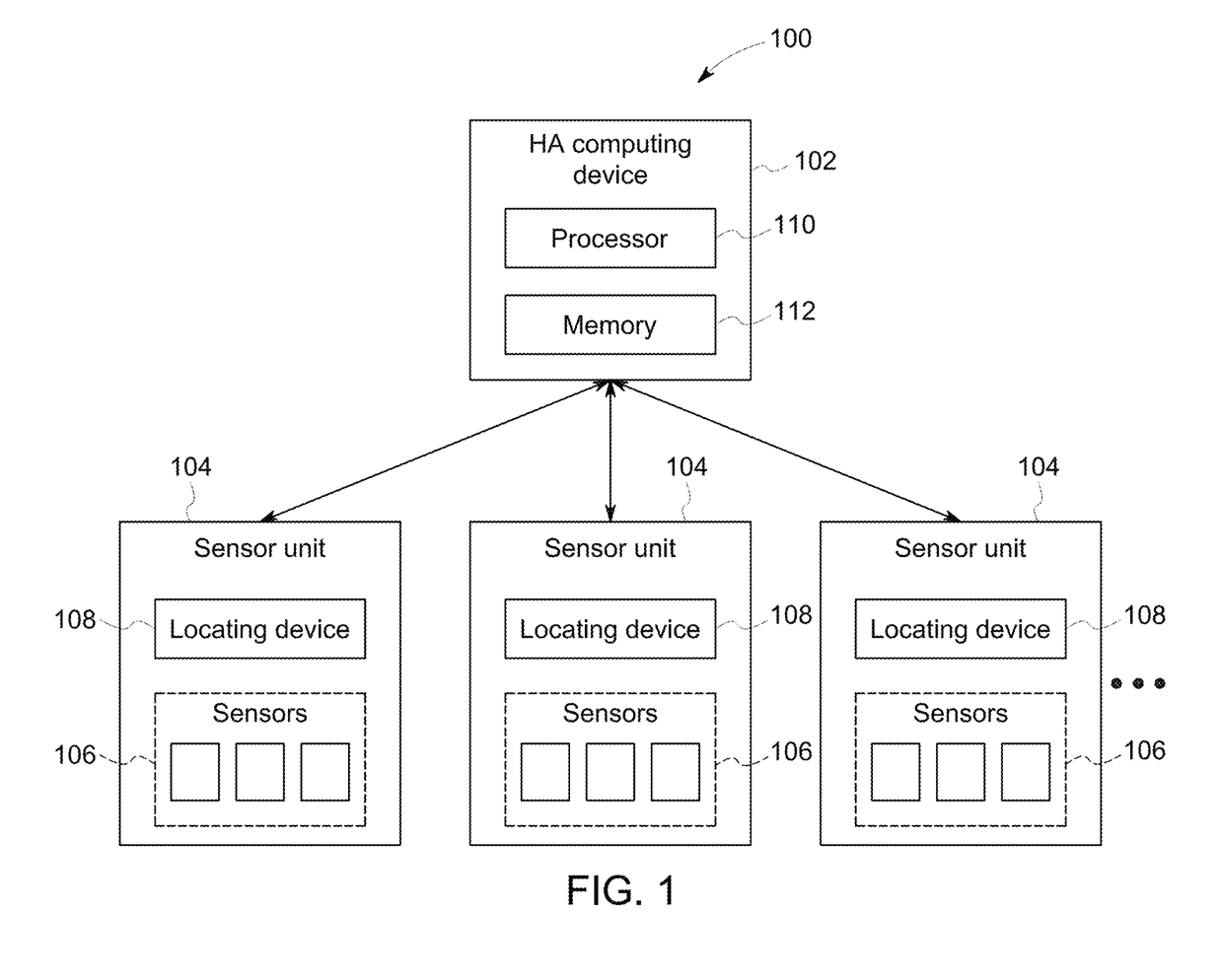
FIG. 1 is a block diagram of an exemplary hazard analysis (HA) system.

FIG. 1 is a block diagram of an exemplary hazard analysis (HA) system 100. HA system 100 includes an HA computing device 102 and one or more sensor units 104. HA computing device 102 is a central server that communicates with sensor units 104 situated, for example, throughout a worksite. As described in further detail below, HA computing device 102 uses data from the distributed sensor units 104 to generate alerts of hazardous conditions in the worksite that correspond to specific locations or individuals. In some embodiments, HA computing device 102 and sensor units 104 communicate wirelessly, for example, using a wireless local area network (WLAN) or cellular connection, or through a direct wireless connection such as, for example, a Bluetooth or ZigBee connection. In some embodiments, HA computing device 102 is configured to communicate with sensor units 104 and other devices via a cloud network or non-cloud computer network. In some embodiments, HA computing device 102 is configured to communicate with sensor units 104 using a personal internet-of-things (PIoT) standard, such as a 3rd Generation Partnership Project (3GPP) standard that defines a protocol for communication between IoT devices (e.g., sensor units 104). In some such embodiments, the PIoT standard is a proprietary standard developed specifically for HA system 100 or similar systems.

Sensor units 104 include one or more sensors 106 and a locating device 108. Sensors 106 include one or more of various types of sensors such as, for example, cameras, gas sensors, temperature sensors, humidity sensors, voltage sensors, electric field sensors, biometric sensors, environmental sensors, sound sensors, pressure sensors, or other sensors that collect data corresponding to an environment of the location of sensor unit 104. Sensor units 104 are configured to transmit the data collected by sensors 106 (sometimes referred to herein as "sensor measurements") to HA computing device 102. In some embodiments, sensor units 104 are configured to generate the sensor measurements in a specific, standard format for transmission to HA computing device 102. Accordingly, HA computing device can interpret data from various sensors 106 regardless of, for example, the type, model, or manufacturer of the sensor 106. In some embodiments, the sensor measurements further include metadata that enables an aggregation and analysis of the sensor measurements received at different times and locations.

Locating device 108 is configured to determine a location of sensor unit 104 (sometimes referred to herein as a "sensor location") and an orientation of sensor unit 104. As described in further detail below, a sensor location may correspond to specific coordinates of a coordinate space of the worksite. In some embodiments, locating device 108 is configured to use a radiolocation system such as, for example, a global positioning system (GPS), to triangulate a location of sensor unit 104 within the worksite. In some embodiments, locating device 108 includes a positional sensor that generates a pointing vector of sensor unit 104. The positional sensor includes a gyroscope or other device that enables locating device 108 to determine an orientation of sensor unit 104 such as, for example, a horizontal or vertical direction that sensor unit 104 is facing. In some embodiments, locating device 108 uses multiple technologies to determine the location of sensor unit 104. For example, GPS may be used for outdoor scenes, and ultra-wide-band (UWB) technology may be used for accurate three dimensional positioning indoors. In some embodiments, locating device 108 utilizes additional sensors to determine a location of sensor unit 104. For example, locating device 108 may use a pressure sensor to determine an elevation of sensor unit 104, and a corresponding story of a floor of the worksite based on the elevation. Further, locating device 108 may include or be in communication with a proximity sensor that detects other sensor units 104 that are within a certain proximity of locating device 108 or a relative proximity between locating device 108 and the other sensor units 104, enabling nearby workers to be identified. In some embodiments, the proximity of workers can be detected by measuring the distance between two locating devices 108, which can in turn be used to evaluate differences in sensor values between nearby users. A combination of proximity and height difference based on pressure measurements can be used to determine a relative location of two nearby workers. For example, if two workers are at a similar horizontal coordinate location but at different elevations, HA computing device 102 may determine that one of the workers is elevated on a ladder or located on a different floor based on the relative height and proximity of the two workers.

In some embodiments, at least some of sensor units 104 are wearable devices. For example, in some such embodiments, sensor units 104 are integrated into helmets or other personal protective equipment (PPE) worn by workers in the worksite, with sensors 106 being attached to or integrated into the wearable device. In such embodiments, each sensor unit 104 can include multiple sensors 106 of a given sensor type, which may increase an amount of data that can be collected by sensor unit 104 at a given time and may enable data collected by a single sensor unit 104 to determine, for example, a direction of a hazard source with respect to the sensor unit 104. Further, the wearable devices may include additional components such as, for example, loudspeakers, display screens, and vibrating components, which can be used to generate and display alerts regarding hazards to the wearer.

Utilizing a greater number of sensors 106 that are, for example, located in a greater number of different positions increases the precision with which HA computing device 102 can quantify the hazard risk for a given location, the resolution at which HA computing device 102 can determine a generate a hazard map, and the accuracy with which HA computing device 102 identify the locations of potential hazards. Accordingly, in some embodiments, HA system 100 includes many sensor units 104 that are carried about the worksite by many different workers, enabling many field measurements to be taken relatively quickly throughout the worksite. While sensor units 104 are described herein as being wearable devices, in some embodiments, some or all of sensor units 104 are stationary installations. For example, in some embodiments, the worksite may include an array of sensors 106 installed throughout the worksite, each sensor 106 having a known location or coordinates.

HA computing device 102 includes a processor 110 and a memory device 112, which in some embodiments perform some or all of the functions described with respect to HA computing device 102. Memory device 112 is configured to store data (sometimes referred to herein as a "scene definition") that represents a worksite. The scene definition defines a coordinate space of the worksite. For example, in some embodiments, each location of a worksite is assigned a set of Cartesian coordinates or other coordinates that describe each location relative to the position of a reference point. In some embodiments, the scene definition defines or includes data representing additional elements of the worksite, such as boundaries. For example, in some embodiments, the worksite is divided into rooms, zones, or other areas that are defined by the scene definition.

In some embodiments, memory device 112 is further configured to store sensor measurements captured by sensors 106 of sensor units 104. In some embodiments, memory device stores additional information corresponding to sensor units 104 and workers and locations associated with sensor units 104. As described in further detail below, in some embodiments, memory device 112 stores various computer instructions and modules that enable HM computing device 102 to provide a cloud-based or other network platform for monitoring conditions the worksite based on sensor data.

In some embodiments, memory device is further configured to store a reference map corresponding to a location monitored by HA system 100. The reference map includes a plurality of location bins that correspond to each of a plurality of locations of the worksite. For example, in some embodiments, the reference map is an array of location bins that correspond to a specific two dimensional area or three dimensional space of the worksite. In some such embodiments, memory device 112 is further configured to store, for each location bin, current, historical, or average risk scores or sub-risk scores associated with each sensor unit 104 or corresponding worker or location.

HA computing device 102 is configured to receive, from sensors 106, a plurality of sensor measurements. In some embodiments, HA computing device 102 receives the sensor measurements simultaneously or continuously, intermittently, or periodically over a set period of time. Accordingly, a single worker wearing sensor unit 104 can capture a plurality of different sensor measurements, each from a different location within the worksite.

HA computing device 102 is further configured to receive, from locating devices 108, coordinates of the coordinate space. Based on the received coordinates, HA computing device 102 is further configured to determine a sensor location of sensor unit 104 during each sensor measurement. For example, in some embodiments, each measurement may be transmitted to HA computing device 102 from sensor unit 104 in a data packet that includes the sensor measurement values for each measured parameter, a location of sensor unit 104 during the measurement, and other data such as, for example, an orientation of each sensor 106 during the measurement, and a timestamp or an identifier corresponding to the sensor unit 104 and/or sensor 106 from which the measurement originates. In some embodiments, when a sensor measurement is received, HA computing device 102 is further configured to interpolate a sensor location corresponding to the sensor measurement based on one or more sensor location measurements received, for example, close to a time that the sensor measurement was received. In some embodiments, the scene definition further includes data that defines other elements of the worksite such as, for example, entrances, exits, hazard areas, and equipment locations of the worksite. In such embodiments, each of these elements is associated with a set or range of coordinates that describes a position or area of the element within the worksite.

HA computing device 102 is further configure to determine, for at least one sensor unit 104, that an alert condition is present based on the scene definition, the plurality of sensor measurements, and coordinates associated with the at least one sensor unit. For example, HA computing device 102 may determine, based on sensor measurements and associated coordinates received from the sensor units 104, that a hazard or hazardous conditions are present in a specific area. For example, if gas level measurements taken in a given room are high (e.g., above an alert threshold), HA computing device 102 may determine that a gas hazard is present in the room, and accordingly, determine that sensor units 104 currently present in the room are under an alert condition. Further, as described in further detail below, HA computing device may determine that a hazard source such as an electric field source is in a given location, and accordingly, determine that sensor units 104 within a threshold distance of the hazard source are under an alert condition.

In some embodiments, HA computing device 102 utilizes sensor fusion to determine that an alert condition is present. For example, in some embodiments, HA computing device 102 utilizes redundant sensor measurements and/or smoothing algorithms to enhance the precision and accuracy of sensor measurements. In some embodiments, HA computing device 102 utilizes combinations of sensors to determine parameters that cannot be measured using a single sensor. For example, concurrent measurements from multiple position sensors onboard sensor unit 104 may be used to determine an angle of orientation of sensor unit 104. In some embodiments, HA computing device 102 utilizes sensor fusion to determine scores or other metrics based on multiple types of sensor measurements. For example, as described in further detail below, HA computing device 102 may compute risk scores based on sensor measurements.

In some embodiments, HA computing device 102 is further configured to compute, based on the plurality of sensor measurements and the plurality of sensor locations, a plurality of sub-risk scores, each sub-risk score of the plurality of sub-risk scores corresponding to a risk factor. In some embodiments, the sub-risk scores may correspond to environmental risks (e.g., temperature, electric field, or gas) and/or health risks (e.g., high body temperature, high heart rate, or high blood pressure). The sub-risk scores are calculated based on one or more sensor measurements and other factors such as, for example, location or time of exposure to the risk. For example, as described below, in some embodiments HA computing device 102 is configured to determine a location of hazards in the worksite. HA computing device 102 may use a distance of the worker or sensor unit 104 from the location of a hazard when computing certain sub-risk scores. In some embodiments, HA computing device 102 is configured to determine, for each of the sub-risk scores, a risk category. For example, a sub-risk score may be categorized as one of safe, caution, extreme caution, danger, or extreme danger. The sub-categories are defined by thresholds that may be individually set for each worker based on factors such as, for example, ability, experience, or health. In some embodiments, HA computing device 102 is configured to compute the sub-risk scores in real time, such that the sub-risk score reflects a current risk of hazard of the worker or location associated with sensor unit 104.

In such embodiments, HA computing device 102 is further configured to compute a risk score based on the sub-risk scores. In some such embodiments, HA computing device 102 uses the risk score for a given location or sensor unit 104 to determine that an alert condition is present for the given location or sensor unit 104. To compute the risk score, HA computing device 102 may, for example, aggregate, sum, take a weighted average of, or otherwise combine the sub-risk scores to generate a single quantity that reflects a risk of hazard to which a worker or location associated with sensor unit 104 is exposed. In some embodiments, a higher risk score corresponds to a greater hazard. Additionally or alternatively, in some embodiments, HA computing device 102 generates a safety score. In some such embodiments, the safety score is inversely related to the risk score, such that a higher safety score indicates that the worker or the location has a lower risk of hazard. In some embodiments, HA computing device 102 computes aggregate risk scores for a defined area or worksite based on risk scores associated with sensor units 104 located within the defined area or worksite. In some embodiments, HA computing device 102 is configured to compute the risk scores and/or safety scores in real time, such that the sub-risk score reflects a current risk of hazard of the worker or location associated with sensor unit 104.

HA computing device 102 is further configured to determine that an alert condition is present in response to the risk score being greater than a threshold risk score. In some embodiments, if the HA computing device 102 determines that an alert condition is present for a sensor unit 104 or location, HA computing device 102 is configured to transmit warning notifications to the corresponding worker or location. In some embodiments, sensor units 104 include a display screen or augmented reality (AR) device that displays information such as the risk score, the sub-risk scores, and warning notifications associated with the corresponding sensor unit 104. In some embodiments, sensor units 104 include a loudspeaker that emits a sound response to the warning notification. In some embodiments, sensor unis 104 include one or more vibrating components that provide haptic feedback, for example, in response to a warning notification. In some embodiments, HA computing device 102 transmits, for example, an email, text message, or other notification message to a smart phone associated with the identified workers. In some embodiments, HA computing device 102 transmits risk scores and corresponding alerts, for example, to a supervisor or to other nearby workers. In some embodiments, HA computing device 102 is further configured to determine if a given sub-risk score is greater than a threshold sub-risk score, and transmit a corresponding warning notification. For example, if a given worker has a temperature sub-risk score that exceeds a temperature sub-risk score threshold, HA computing device 102 may transmit a warning message to the worker indicating that the worker may be exposed to dangerous temperatures. In some embodiments, the risk score threshold and/or sub-risk score thresholds are individually set for each worker based on factors such as, for example, ability, experience, or health.

In some embodiments, HA computing device 102 is further configured to compute, for a given sensor unit 104 or for a given worker or location, average sub-risk scores, an average risk-score, and/or an average safety score over time active in the worksite. The average scores may be used by HA computing device 102 to determine, for example, alert thresholds or risk category thresholds for the worker or location. For example, HA computing device 102 may generate an alert if a risk score or sub-risk score deviates from the corresponding average risk score or sub-risk score by a threshold amount or percentage.

In some embodiments, HA computing device 102 is further configured to identify, for each sensor location, a location bin. For example, the location bins may be defined by the scene definition, such that HA computing device 102 associates each set of coordinates of the worksite with a location bin corresponding to a range of area of the worksite corresponding to the coordinates. In some such embodiments, HA computing device 102 computes one or more of the sub-risk scores for a sensor unit 104 based on sensor measurements captured within a location bin where the sensor unit 104 is located. In some such embodiments, HA computing device 102 is configured to compute a sub-risk score, a risk score, and/or a safety score for each location bin.

In some embodiments, HA computing device 102 uses the sensor measurements and corresponding coordinates as data inputs to generate one or more maps of sensor measurements and corresponding hazard conditions throughout the worksite. For example, a regression analysis such as polynomial regression may be used to interpolate data points corresponding to sensor values at location bins or coordinates that do not have a current corresponding sensor measurement from one of sensor units 104. Additionally or alternatively, HA computing device 102 may use other algorithms to generate a map of measured and interpolated sensor values throughout the worksite. In some embodiments, HA computing device 102 is in communication with, for example, a display screen, through which HA computing device 102 can display the generated map and the identified hazard conditions, for example, as an overlay on the generated map. In some embodiments, HA computing device 102 is configured to calculate the sub-risk scores and generate alerts further based on interpolated sensor values.

Figure 2:
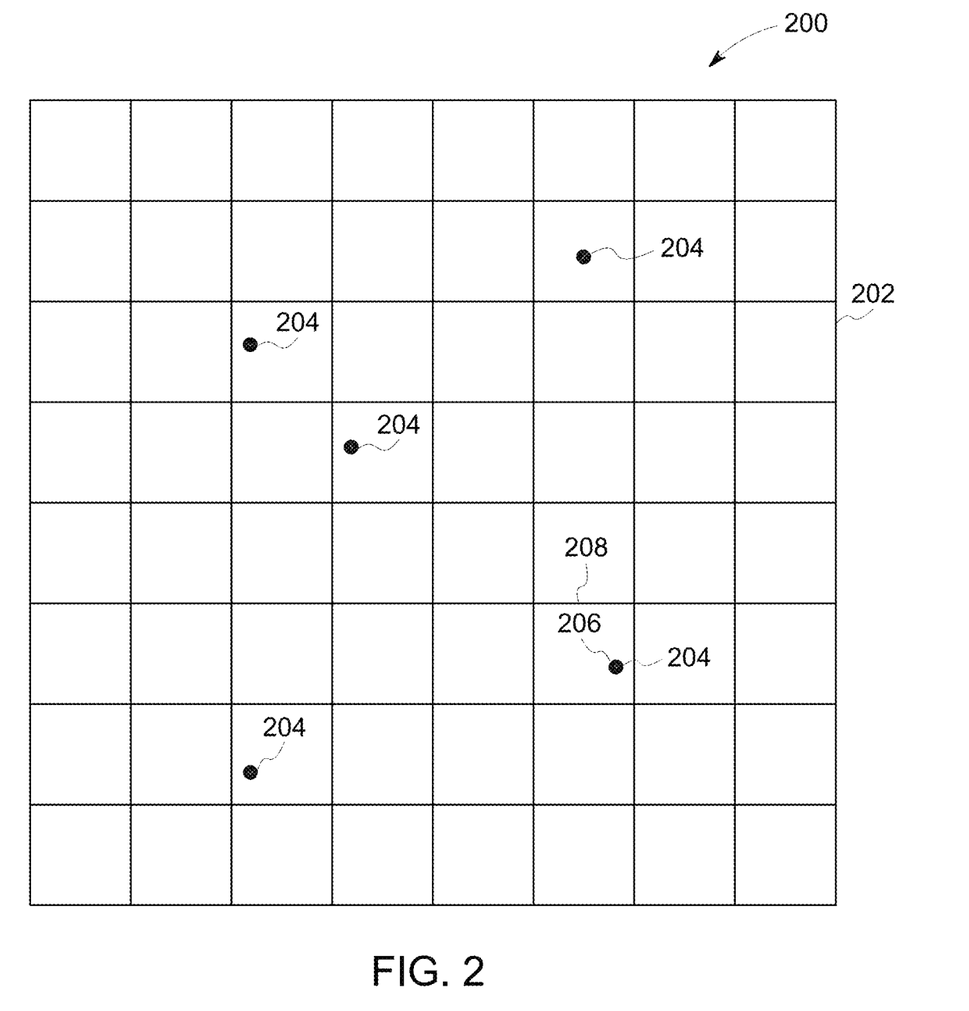
FIG. 2 is an exemplary reference map used by the HA system shown in FIG. 1.

FIG. 2 is an exemplary hazard map 200. In some embodiments, hazard map 200 is generated by HA system 100 (shown in FIG. 1), for example, using HA computing device 102. Hazard map 200 includes a plurality of location bins 202. Each location bin 202 corresponds to a specific area of a worksite, and may be defined, for example, by coordinates with respect to the scene definition. Each location bin 202 is associated with data such as, for example, one or more historical sensor measurements, sub-risk scores, or risk scores. For example, in some embodiments, each location bin 202 is associated with a first set of reference sensor levels that correspond to expected sensor values for the corresponding location under normal, non-hazard conditions, and one or more additional sets of reference sensor levels that correspond to expected sensor values for different hazard conditions. In such embodiments, each reference sensor level of a given set may correspond to, for example, a different measured parameter. In some embodiments, each location bin is associated with a set of sub-risk scores. In such embodiments, each sub-risk score, for example, a different measured parameter or combination of measured parameters.

As described above with respect to FIG. 1, sensor measurements are taken using one or more sensor units 104. Each measurement is taken at a corresponding sensor location 204 having specific coordinates of the coordinate space. In some embodiments, to determine current hazard conditions, HA computing device 102 determines a location bin 202 that corresponds to each sensor location 204. For example, a first sensor location 206 is located within an area that corresponds to a first location bin 208, and accordingly, HA computing device 102 is configured to associate first sensor location 206 with first location bin 208.

Figure 3:
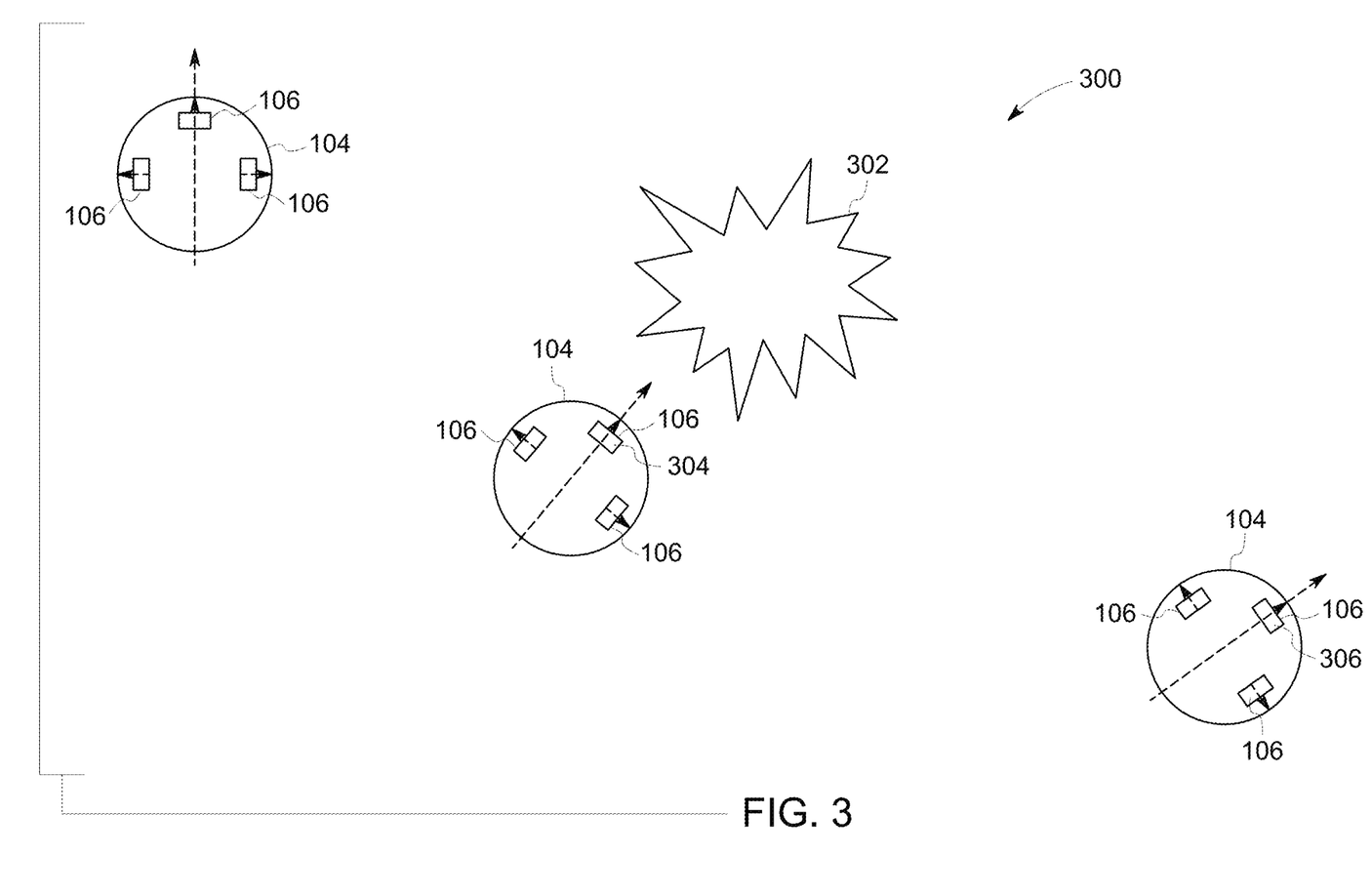
FIG. 3 is a plan view of an exemplary worksite in which the exemplary HA system shown in FIG. 1 is implemented.

FIG. 3 is a plan view of an exemplary worksite 300 in which HA system 100 (shown in FIG. 1) is implemented. Worksite 300 includes sensor units 104 including sensors 106, which generally function as described with respect to FIG. 1. In the example embodiment shown in FIG. 3, sensor units 104 are helmets worn by workers at worksite 300.

Worksite 300 includes a hazard source 302. Hazard source 302 may be, for example, a heat source such as a fire or overheating device, an electric field source, a source of fumes, or another source that results in effects detectable by sensors 106. Hazard source 302 generates effects in worksite 300 that may be measured or detected by sensors 106. For example, in embodiments where sensors 106 are electric field sensors, sensors 106 detect a specific electric field magnitude that depends on the location and orientation of sensor 106 with respect to hazard source 302. For example, a first sensor 304 that is located close to and oriented facing hazard source 302 may detect a relatively high electric field magnitude, while a second sensor 306 that is located farther away from and oriented perpendicular to hazard source 302 may detect a relatively low electric field magnitude.

Figure 4:
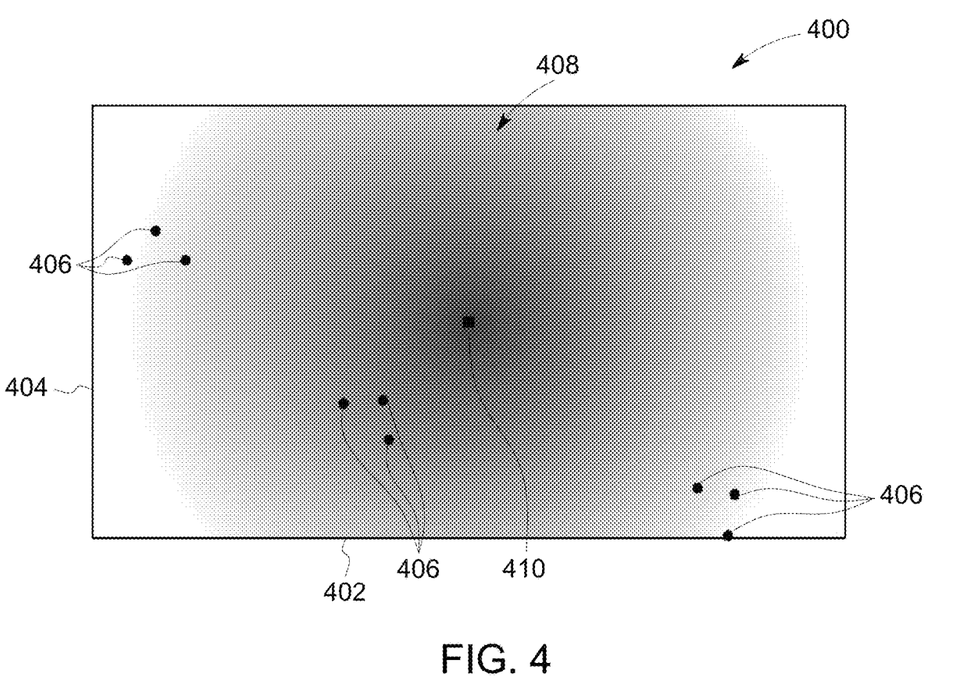
FIG. 4 is an exemplary hazard map representing a calculated magnitude of a hazard in the worksite illustrated in FIG. 3.

FIG. 4 is a hazard map 400 showing a calculated magnitude of a hazard in worksite 300 (shown in FIG. 3). For example, in some embodiments, hazard map 400 depicts an electric field magnitude, a temperature, or another parameter that can be measured in worksite 300 by sensors 106. In some embodiments, hazard map 400 is generated by HA computing device 102 (shown in FIG. 1). Hazard map 400 includes a horizontal axis 402 and a vertical axis 404 that correspond to a length along respective dimensions of worksite 300. For example, horizontal axis 402 may correspond to position in an east-west direction in meters or feet from a reference position, and vertical axis 404 may correspond to position in a north-south direction in meters of feet from a reference position. In some embodiments, horizontal axis 402 and vertical axis 404 correspond to coordinates of the coordinate space defined by the scene definition.

Hazard map 400 further shows data points 406. Each data point 406 illustrates a position at which a measurement is taken with respect to horizontal axis 402 and vertical axis 404. While the locations of data points 406 correspond to the locations of sensors 106 shown in FIG. 3, in some embodiments, data points 406 are generated based on, for example, measurements from fewer sensors taken at different locations at different times. Each data point 406 also has a corresponding sensor measurement such as, for example, an electric field magnitude or temperature. As described with respect to FIG. 1, in some embodiments, HA computing device 102 is configured to use data points 406 to predict values that were not directly measured for the rest of worksite 300. Such predicted values are illustrated in FIG. 4 as a color gradient 408. Darker portions of color gradient 408 correspond to areas of greater magnitude values, while lighter portions of color gradient 408 correspond to areas of lesser magnitude values. A darkest portion of color gradient 408 is at a maximum value 410, which corresponds to hazard source 302 (shown in FIG. 3). For example, if hazard source 302 is an electric field source, an electric field magnitude will be greatest at maximum value 410. As such, the location of hazard source 302 may be determined using hazard map 400.

In some embodiments, HA computing device 102 is configured to generate a sub-risk score, for example, for an electric field risk for each worker based in part on a proximity of each worker to hazard source 302 and the magnitude of data points 406 and color gradient 408 corresponding to a location of each worker.

Figure 5:
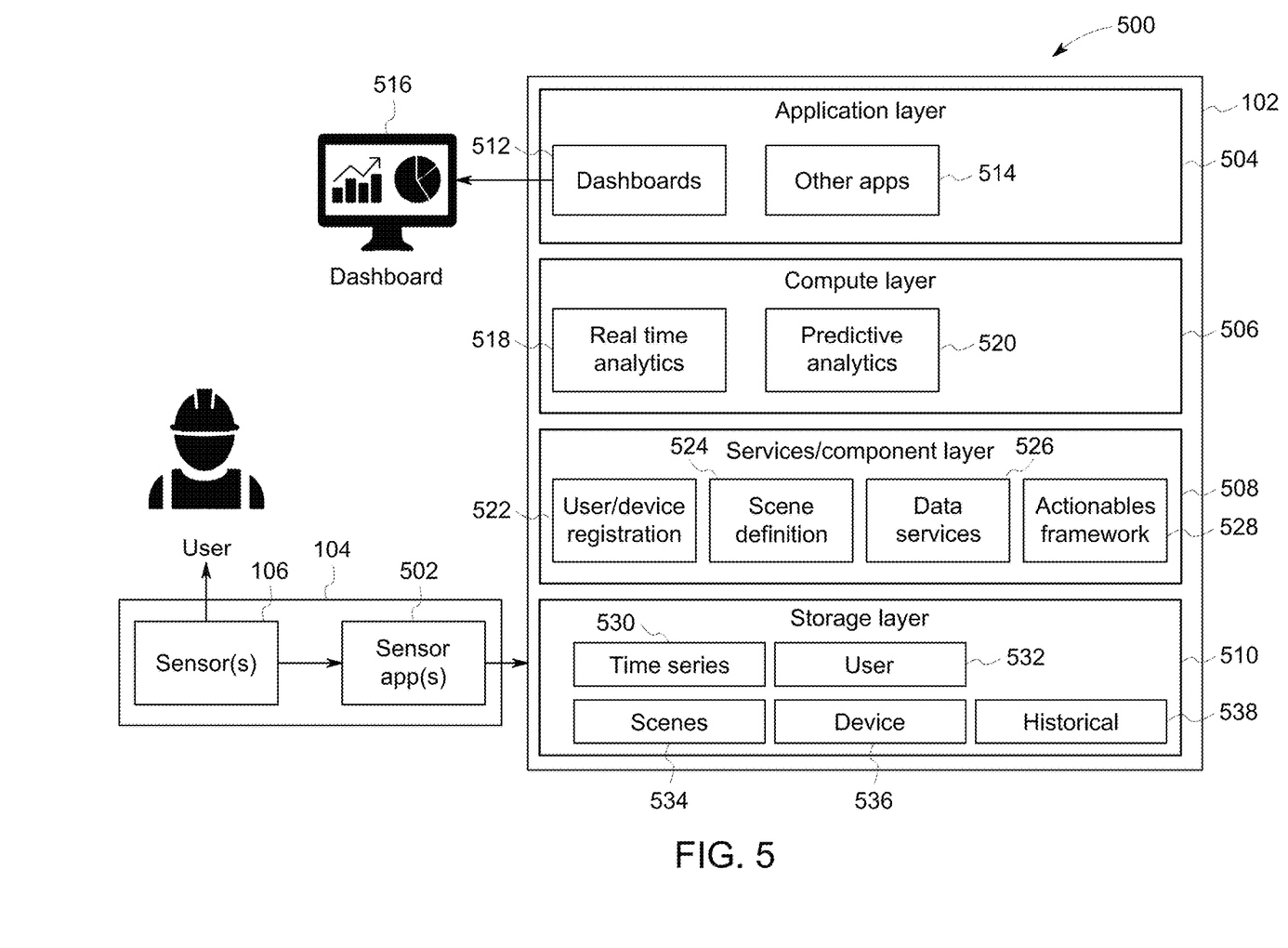
FIG. 5 is an exemplary platform implemented using the HA system shown in FIG. 1.

FIG. 5 is an exemplary platform 500 for monitoring a worksite implemented using HA system 100 (shown in FIG. 1). Platform 500 includes HA computing device 102, sensor unit 104, and sensors 106, which generally function as described with respect to FIG. 1.

Sensor unit 104 is configured to execute one or more sensor applications 502 that manage data collection from sensors 106. For example, in some embodiments, sensor applications 502 generate sensor data in a standardized format based on signals received from sensors 106.

HA computing device 102 is configured to execute an application layer 504, a compute layer 506, a services/component layer 508, and a storage layer 510, for example, using processor 110 and memory device 112.

Application layer 504 includes a dashboard module 512 and an applications module 514. Dashboard module 512, when executed by HA computing device 102, enables HA computing device 102 to display or cause other computing devices in communication with HA computing device 102 to display information via a dashboard 516, for example, to a worksite supervisor. In some embodiments, the data includes sensor measurements and their locations, current locations of sensor units 104, current alert conditions, risk scores, and sub-risk scores for sensor units 104, workers, and/or locations within the worksite, and historical sensor measurements and risk scores corresponding to workers and locations within the worksite. Applications module 514, when executed by HA computing device 102, enables similar data to be displayed via applications, for example, at sensor units 104 or at registered mobile devices of workers within the worksite.

Compute layer 506 includes a real-time analytics module 518 and a predictive analytics module 520. Real-time analytics module 518, when executed by HA computing device 102, uses real-time sensor measurements to, for example, determine that alert conditions are present, generate risk scores for locations within the worksite, to locate current hazards, and to generate alert notifications based on collected sensor measurements. Predictive analytics module 520, when executed by HA computing device 102, uses sensor measurements to predict future conditions in the worksite and establish reference sensor levels, such that future alerts may be generated based on a detected deviation from the reference sensor levels.

Services/component layer 508 includes a user/device registration module 522, a scene definition module 524, a data services module 526, and an actionables framework module 528. User/device registration module 522, when executed by HA computing device 102, manages the registration of users (e.g., workers) and devices (e.g., sensor units 104) with platform 500, and associates the devices with corresponding users. Scene definition module 524, when executed by HA computing device 102) manages scene definitions (described above with respect to FIG. 1) associated with the worksite. Data services module 526, when executed by HA computing device 102, provides a query interface to retrieve site or scene configurations, sensor configurations, historical time series sensor measurements, and aligned sensor data. Actionables framework module 528, when executed by HA computing device 102, determines when actionables (e.g., alert notifications) should be implemented and which users, devices, and/or locations are associated with the actionables.

Storage layer 510, when executed by HA computing device 102, manages the storage of data by HA computing device 102, for example, in memory device 112. In some embodiments, the data includes time series data 530 (e.g., time series of sensor measurements from sensor units 104), user data 532 (e.g., data corresponding to registered workers), scene data 534 (e.g., data corresponding to scene definitions and the worksite), device data 536 (e.g., data corresponding to sensor units 104), and historical data 538 (e.g., historical sensor measurements, risk scores, and alert data).

Figure 6:
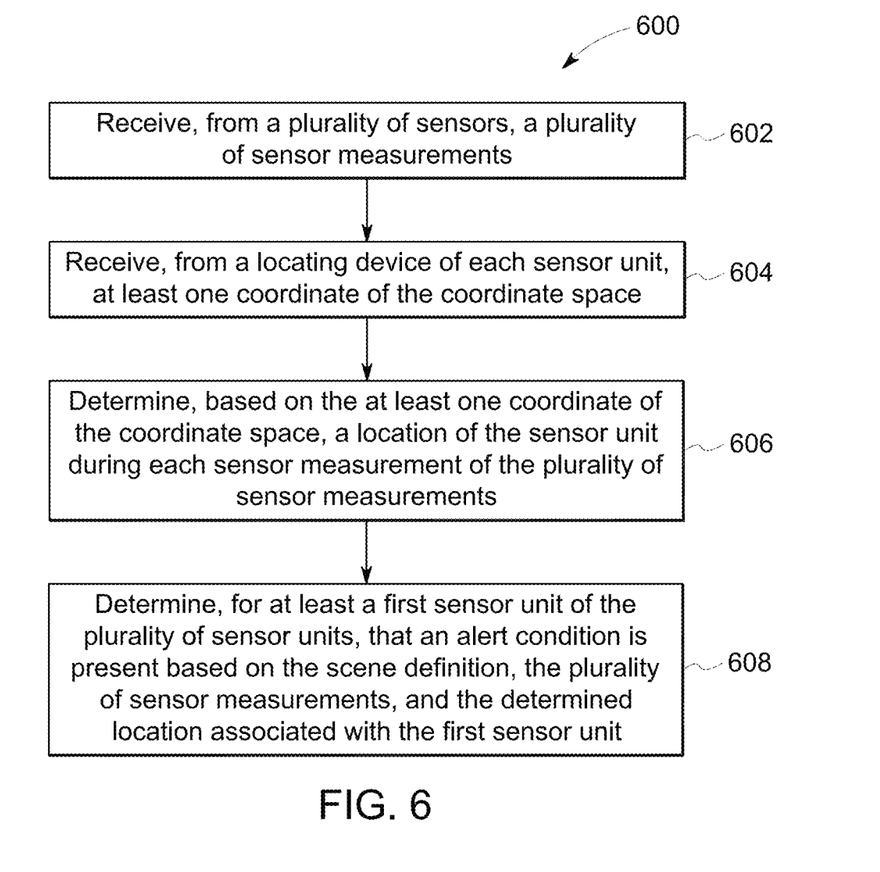
FIG. 6 is a flowchart of an exemplary method for generating hazard alerts.

FIG. 6 is a flowchart illustrating an exemplary method 600 for generating hazard alerts. In some embodiments, method 600 is performed by HA system 100 (shown in FIG. 1), for example, using HA computing device 102.

Method 600 includes receiving 602, by at least one processor (such as processor 110), from a plurality of sensors (such as sensors 106), a plurality of sensor measurements. In some embodiments, the plurality of sensors is included in at least one sensor unit (such as sensor unit 104). In some embodiments, the sensor units further include a wearable device, wherein the plurality of sensors are configured to be attached to the wearable device. In some embodiments, a memory device is configured to store device data corresponding to the plurality of sensor units. In such embodiments, the device data includes an identifier of at least one user associated with each sensor unit of the plurality of sensor units.

Method 600 further includes receiving 604, by the at least one processor from a locating device (such as locating device 108) of each sensor unit, at least one coordinate of the coordinate space.

Method 600 further includes determining 606, based on the at least one coordinate, a location of the sensor unit during each sensor measurement of the plurality of sensor measurements.

Method 600 further includes determining 608, by the at least one processor, for at least a first sensor unit of the plurality of sensor units, that an alert condition is present based on a scene definition, the plurality of sensor measurements, and the determined location associated with the first sensor unit. The scene definition scene defines a coordinate space of a worksite. In some embodiments, the scene definition further defines at least one of entries, exits, hazard areas, and equipment locations of the worksite. In some embodiments, the alert condition corresponds to a location defined by the scene definition.

In some embodiments, method 600 further includes computing, by the at least one processor, a risk score for the first sensor unit, and determining, by the at least one processor, that the alert condition is present further based on the risk score.

In some embodiments, the sensor units further include a loudspeaker attached to the wearable device, and method 600 further includes causing, by the at least one processor, the loudspeaker to generate an audio notification based on the determination that the alert condition is present.

In some embodiments, first sensor units further includes a display screen, and method 600 further includes causing, by the at least one processor, the display screen to display a notification based on the determination that an alert condition is present.

In some embodiments, the at least one processor is further in communication with a display, and method 600 further includes causing, by the at least one processor, the display to display a dashboard including an indicator that the alert condition is present.

In some embodiments, method 600 further includes executing, by each sensor unit of the plurality of sensor units, a sensor application that converts data captured at the plurality of sensors to a common format.

An exemplary technical effect of the methods, systems, and apparatus described herein includes at least one of: (a) real-time collection of data by a system from various sensor types utilizing sensor units that generate sensor data in a standardized format; (b) aggregating sensor data from multiple sensor units using metadata and sensor data standards; (c) identifying warning and dangerous situations in a worksite by aggregating sensor data from a plurality of distributed sensor units; (d) generating a risk score that summarizes a safety condition of a worker or location by computing a plurality of sub-risk scores corresponding to different risk conditions based on sensor measurements and computing the risk score based on the plurality of sub-risk scores; (e) determining that alert conditions are present by comparing current sensor data and risk scores to historical sensor data and risk scores; (0 generating real time alerts by aggregating and analyzing real-time sensor data from a plurality of sensor units in a worksite and using multiple communication modalities to transmit the alerts to users; and (g) providing a dashboard interface through which hazard conditions, alerts, and sensor data corresponding to a worksite can be viewed by using a computing device in communication with a plurality of sensor units in a worksite to analyze real-time and historical sensor data.

Exemplary embodiments of a system for generating hazard alerts using quantitative scoring are provided herein. The systems and methods of operating and manufacturing such systems and devices are not limited to the specific embodiments described herein, but rather, components of systems and/or steps of the methods may be utilized independently and separately from other components and/or steps described herein. For example, the methods may also be used in combination with other electronic systems, and are not limited to practice with only the electronic systems, and methods as described herein. Rather, the exemplary embodiment can be implemented and utilized in connection with many other electronic systems.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for generating hazard alerts, said system comprising:
    a plurality of sensor units, each sensor unit of said plurality of sensor units comprising a plurality of sensors and a locating device, said plurality of sensors comprising at least one first sensor of a first type and at least one second sensor of a second type; and
    a hazard analyzing (HA) computing device configured to communicate with said plurality of sensor units, said HA computing device comprising:
        at least one memory device configured to store a scene definition, the scene definition defining a coordinate space of a worksite; and
        at least one processor, wherein said at least one processor is configured to:
            receive, from said plurality of sensors for each sensor unit, a plurality of sensor measurements, the plurality of sensor measurements including a plurality of first measurements from said at least one first sensor and a plurality of second measurements from said at least one second sensor;
            receive, from said locating device of each sensor unit, at least one coordinate of the coordinate space;
            determine, based on the at least one coordinate, a location of each sensor unit during each sensor measurement of the plurality of sensor measurements;
            compute a fused metric based on the plurality of sensor measurements including the first measurements and the second measurements for each sensor unit; and
            determine, for at least a first sensor unit of said plurality of sensor units, that an alert condition is present based on the scene definition, the fused metric, an alert threshold, and the determined location associated with said first sensor unit, wherein the alert threshold is computed by averaging the fused metric over time.

2. The system of claim 1, wherein the scene definition further defines at least one of entries, exits, hazard areas, and equipment locations of the worksite.

3. The system of claim 1, wherein said at least one processor is further configured to:
    compute a risk score for said first sensor unit; and
    determine that the alert condition is present further based on the risk score.

4. The system of claim 1, wherein said first sensor unit of said plurality of sensor units further comprises a wearable device, and wherein said plurality of sensors are configured to be attached to said wearable device.

5. The system of claim 4, wherein said first sensor unit further comprises a loudspeaker attached to said wearable device, and wherein said at least one processor is further configured to cause said loudspeaker to generate an audio notification based on the determination that the alert condition is present.

6. The system of claim 4, wherein said first sensor unit further comprises a display screen, and wherein said at least one processor is further configured to cause said display screen to display a notification based on the determination that an alert condition is present.

7. The system of claim 1, wherein said memory device is further configured to store device data corresponding to said plurality of sensor units, the device data including an identifier of at least one user associated with each sensor unit of said plurality of sensor units.

8. The system of claim 1, wherein said at least one processor is further in communication with a display, and wherein said at least one processor is further configured to cause said display to display a dashboard including an indicator that the alert condition is present.

9. The system of claim 1, wherein each sensor unit of said plurality of sensor units is further configured to execute a sensor application that converts data captured at said plurality of sensors to a common format.

10. The system of claim 1, wherein the alert condition corresponds to a location defined by the scene definition.

11. A method for generating hazard alerts, said method performed by a hazard analysis (HA) computing device including at least one processor coupled to at least one memory device and further coupled to at least one sensor unit including a plurality of sensors and a locating device, the plurality of sensors including at least one first sensor of a first type and at least one second sensor of a second type, the at least one memory device configured to store a scene definition defining a coordinate space of a worksite, said method comprising:
    receiving, by the at least one processor, from the plurality of sensors for each sensor unit, a plurality of sensor measurements, the plurality of sensor measurements including a plurality of first measurements from the at least one first sensor and a plurality of second measurements from the at least one second sensor;
    receiving, by the at least one processor from the locating device of each sensor unit, at least one coordinate of the coordinate space;
    determining, by the at least one processor, based on the at least one coordinate, a location of each sensor unit during each sensor measurement of the plurality of sensor measurements;

computing, by the as least one processor, a fused metric based on the plurality of sensor measurements including the first measurements and the second measurements for each sensor unit; and determining, by the at least one processor, for at least a first sensor unit of the plurality of sensor units, that an alert condition is present based on the scene definition, the fused metric, an alert threshold, and the determined location associated with the first sensor unit, wherein the alert threshold is computed by averaging the fused metric over time.

12. The method of claim 11, wherein the scene definition further defines at least one of entries, exits, hazard areas, and equipment locations of the worksite.

13. The method of claim 11, further comprising:
computing, by the at least one processor, a risk score for the first sensor unit; and
determining, by the at least one processor, that the alert condition is present further based on the risk score.

14. The method of claim 11, wherein the first sensor unit of the plurality of sensor units further includes a wearable device, and wherein the plurality of sensors are configured to be attached to the wearable device.

15. The method of claim 14, wherein the first sensor unit further includes a loudspeaker attached to the wearable device, and wherein said method further comprises causing, by the at least one processor, the loudspeaker to generate an audio notification based on the determination that the alert condition is present.

16. The method of claim 14, wherein the first sensor unit further includes a display screen, and wherein said method further comprises causing, by the at least one processor, the display screen to display a notification based on the determination that an alert condition is present.

17. The method of claim 11, wherein the memory device is further configured to store device data corresponding to the plurality of sensor units, the device data including an identifier of at least one user associated with each sensor unit of the plurality of sensor units.

18. The method of claim 11, wherein the at least one processor is further in communication with a display, and wherein said method further comprises causing, by the at least one processor, the display to display a dashboard including an indicator that the alert condition is present.

19. The method of claim 11, further comprising executing, by each sensor unit of the plurality of sensor units, a sensor application that converts data captured at the plurality of sensors to a common format.

20. A hazard analysis (HA) computing device comprising at least one processor coupled to at least one memory device and further coupled to at least one sensor unit including a plurality of sensors and a locating device, the plurality of sensors including at least one first sensor of a first type and at least one second sensor of a second type, the at least one memory device configured to store a scene definition defining a coordinate space of a worksite, said at least one processor configured to:

receive, from the plurality of sensors for each sensor unit, a plurality of sensor measurements, the plurality of sensor measurements including a plurality of first measurements from the at least one first sensor and a plurality of second measurements from the at least one second sensor;

receive, from the locating device of each sensor unit, at least one coordinate of the coordinate space;

determine, based on the at least one coordinate, a location of each sensor unit during each sensor measurement of the plurality of sensor measurements;

compute a fused metric based on the plurality of sensor measurements including the first measurements and the second measurements for each sensor unit; and determine, for at least a first sensor unit of the plurality of sensor units, that an alert condition is present based on the scene definition, the fused metric, an alert threshold and the determined location associated with the first sensor unit, wherein the alert threshold is computed by averaging the fused metric over time.

\* \* \* \* \*

UNITED STATES PATENT AND TRADEMARK OFFICE
CERTIFICATE OF CORRECTION

PATENT NO. : 11,410,525 B2
APPLICATION NO. : 16/952419
DATED : August 9, 2022
INVENTOR(S) : SM Shajedul Hasan et al.

It is certified that error appears in the above-identified patent and that said Letters Patent is hereby corrected as shown below:

On the Title Page

Item (72), in Inventors, delete "Sm Shajedul Hasan" and insert therefor -- SM Shajedul Hasan --.

In the Specification

Column 12, Line 40, delete "scores; (0 generating" and insert therefor -- scores; (f) generating --.

Signed and Sealed this
Twenty-fifth Day of October, 2022

Katherine Kelly Vidal
*Director of the United States Patent and Trademark Office*